United States Patent [19]

Cho

[11] Patent Number: 5,563,701

[45] Date of Patent: Oct. 8, 1996

[54] APPARATUS AND METHOD FOR MEASURING DISTANCE OPTICALLY USING PHASE VARIATION

[75] Inventor: Jung S. Cho, Kyoungki-do, Rep. of Korea

[73] Assignee: Hyundai Electronics Industries Co., Ltd., Kyoungki-do, Rep. of Korea

[21] Appl. No.: 359,572

[22] Filed: Dec. 20, 1994

[30] Foreign Application Priority Data

Dec. 29, 1993 [KR] Rep. of Korea ............... 93-30522

[51] Int. Cl.$^6$ ............................................. G01C 3/08
[52] U.S. Cl. ................................. 356/5.15; 356/5.08
[58] Field of Search ............................ 356/5.15, 5.08; 342/127, 135

[56] References Cited

U.S. PATENT DOCUMENTS

| | | | |
|---|---|---|---|
| 3,614,226 | 10/1971 | Vergoz | 356/5.08 |
| 3,652,161 | 3/1972 | Ross | 356/5.07 |
| 3,891,966 | 6/1975 | Sztankay | 340/53 |
| 3,900,261 | 8/1975 | Wingate | 356/5.03 |
| 4,146,328 | 3/1979 | Hullein et al. | 356/5.11 |
| 4,569,599 | 2/1986 | Bolkow et al. | 368/120 |
| 4,942,561 | 7/1990 | Ohishi et al. | 368/118 |
| 5,162,862 | 11/1992 | Bartram et al. | 356/5.15 |
| 5,251,000 | 10/1993 | Ohmamyuda et al. | 356/5.15 |
| 5,329,467 | 7/1994 | Nagamune et al. | 364/561 |

*Primary Examiner*—Thomas H. Tarcza
*Assistant Examiner*—Pinchus M. Laufer
*Attorney, Agent, or Firm*—Fish & Richardson P.C.

[57] ABSTRACT

An apparatus and a method for measuring a distance optically using a phase variation. The apparatus comprises a light emitting circuit for emitting a high-power intermittent pulse light beam to an object, a light receiving circuit for receiving a light beam reflected from the object, a signal generation/phase difference detection circuit for generating first and second pseudo intermittent pulse signals in response to a drive signal from the light emitting circuit and an output signal from the light receiving circuit, respectively, detecting a phase difference between the generated first and second pseudo intermittent pulse signals and measuring a phase-delayed time on the basis of the detected phase difference, and a controller for performing a control operation in response to an output signal from the signal generation/phase difference detection circuit. The first and second pseudo intermittent pulse signals are multiplied by a reference pulse signal, the multiplied signals are low pass filtered and the low pass filtered signals are phase-compensated, respectively. A phase difference between the two phase-compensated signals is detected and a light moving time is calculated on the basis of the detected phase difference. The distance to the object is calculated on the basis of the calculated light moving time.

3 Claims, 3 Drawing Sheets

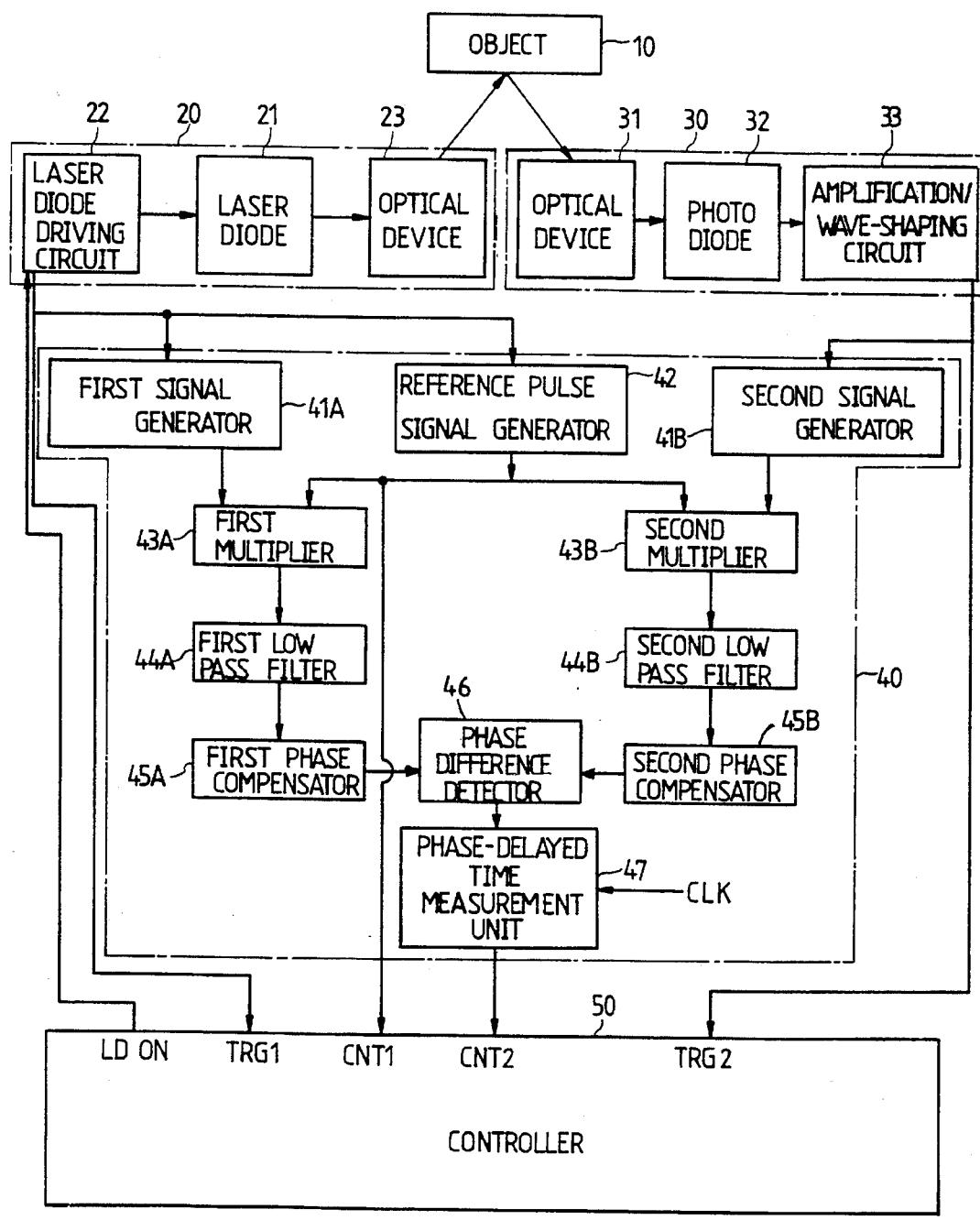

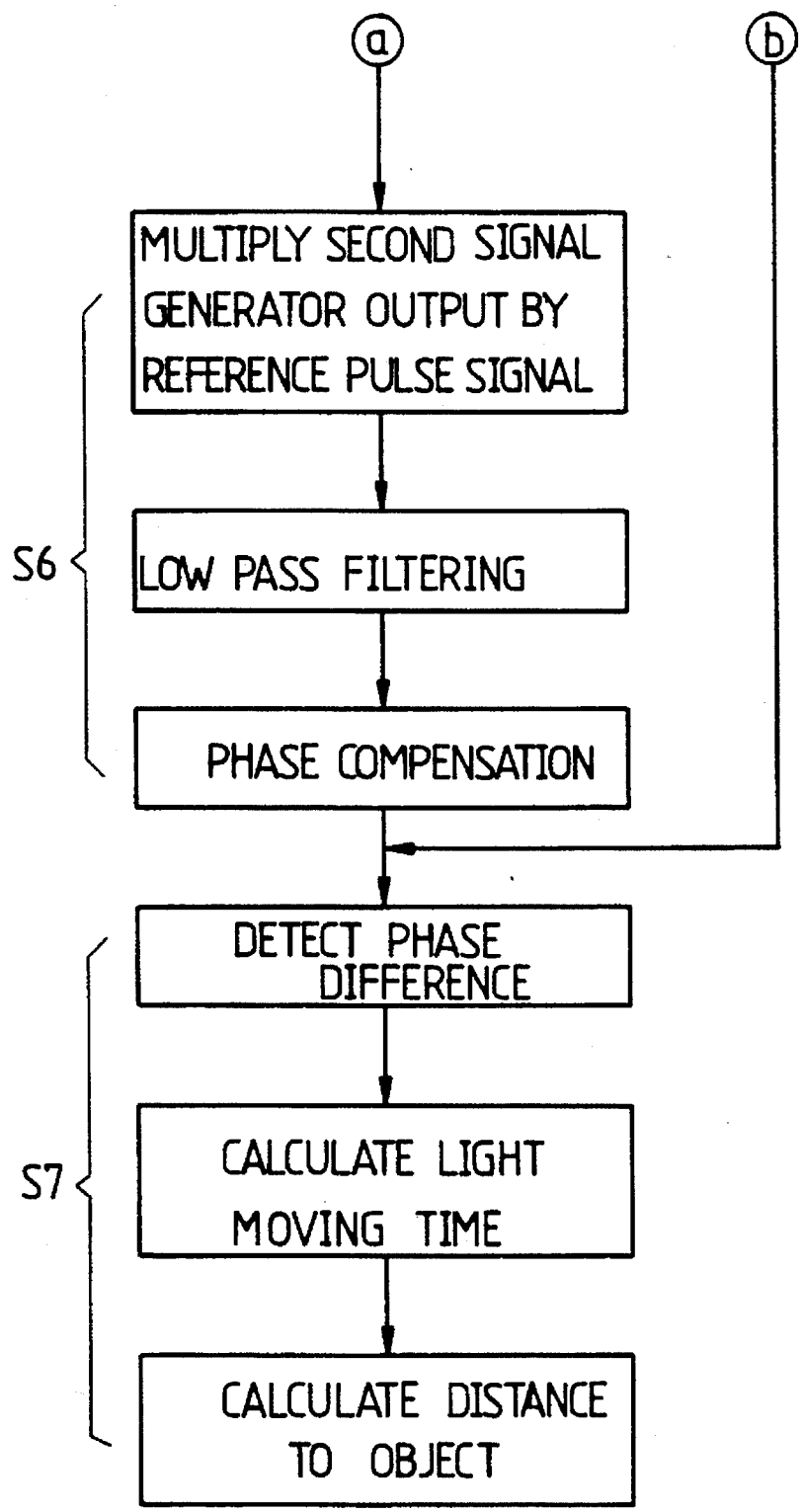

APPARATUS AND METHOD FOR MEASURING DISTANCE OPTICALLY USING PHASE VARIATION

BACKGROUND OF THE INVENTION

1. Field of the Invention

The present invention relates in general to a distance measurement using a light beam, and more particularly to an apparatus and a method for measuring a distance optically using a phase variation in which a distance to an object can be measured with no contact using a light beam, so that they are applicable to various distance measurements including a distance measurement of a car collision prevention system.

2. Description of the Prior Art

Conventional distance measurement equipments are mostly adapted to measure distances to objects relatively using standard measurement devices with corresponding lengths.

Such a conventional distance measurement equipment utilizes trigonometry to measure a distance. For this reason, the conventional distance measurement equipment needs a relative measurement device with a length corresponding to the distance to be measured, or many measurement devices to calculate the distance. As a result, the conventional distance measurement equipment is complex in construction. In particular, it is impossible to install the conventional distance measurement equipment in a car for the purpose of measuring continuously the distance in traveling of the car.

For the purpose of being installed in a desired car to measure continuously distances to the front and rear cars in the traveling, so as to prevent a car collision, distance measurement equipments using a laser beam and an ultrasonic wave have been researched and developed. However, the distance measurement equipment using the ultrasonic wave has a disadvantage in that it cannot perform a long-distance measurement due to a natural characteristic of the ultrasonic wave. Also, the distance measurement equipment using the ultrasonic wave cannot perform the distance measurement at a high speed. On the other hand, the distance measurement equipment using the laser beam may not be able to perform the distance measurement precisely.

SUMMARY OF THE INVENTION

Therefore, the present invention has been made in view of the above problem, and it is an object of the present invention to provide an apparatus and a method for measuring a distance optically using a phase variation in which a distance to an object can simply and rapidly be measured with no contact using a light beam, so that they are applicable to various distance measurements including a distance measurement of a car collision prevention system.

In accordance with one aspect of the present invention, there is provided an apparatus for measuring a distance optically using a phase variation, comprising light emitting means for emitting a high-power intermittent pulse light beam as a distance measuring medium to an object; light receiving means for receiving a light beam reflected from the object; signal generation/phase difference detection means for generating first and second pseudo intermittent pulse signals in response to a drive signal from said light emitting means and an output signal from said light receiving means, respectively, detecting a phase difference between the generated first and second pseudo intermittent pulse signals and measuring a phase-delayed time on the basis of the detected phase difference; and control means for controlling the entire operation of a system in response to an output signal from said signal generation/phase difference detection means.

In accordance with another aspect of the present invention, there is provided a method of measuring a distance optically using a phase variation, comprising the steps of (a) initializing a system and performing a self-diagnostic operation to check whether the system is normal; (b) stopping an operation of the system if it is checked at said step (a) that the system is not normal; (c) emitting a high-power intermittent pulse light beam if it is checked at said step (a) that the system is normal and generating a first trigger pulse signal to generate a first pseudo intermittent pulse signal and a reference pulse signal; (d) multiplying said first pseudo intermittent pulse signal by said reference pulse signal, low pass filtering the multiplied signal and compensating for a phase of the low pass filtered signal; (e) performing a counting operation for said reference pulse signal until a second trigger pulse signal is generated, stopping said reference pulse signal counting operation if said second trigger pulse signal is generated and generating a second pseudo intermittent pulse signal; (f) multiplying said second pseudo intermittent pulse signal by said reference pulse signal, low pass filtering the multiplied signal and compensating for a phase of the low pass filtered signal; and (g) detecting a phase difference between said two phase-compensated signals, calculating a light transit time on the basis of the detected phase difference and calculating a distance to an object on the basis of the calculated light transit time.

BRIEF DESCRIPTION OF THE DRAWINGS

The above and other objects, features and advantages of the present invention will be more clearly understood from the following detailed description taken in conjunction with the accompanying drawings, in which:

FIG. 1 is a block diagram of an apparatus for measuring a distance optically using a phase variation in accordance with the present invention; and FIGS. 2A and 2B are flowcharts illustrating a method of measuring the distance optically using the phase variation in accordance with the present invention.

DETAILED DESCRIPTION OF THE INVENTION

Figure 2A:
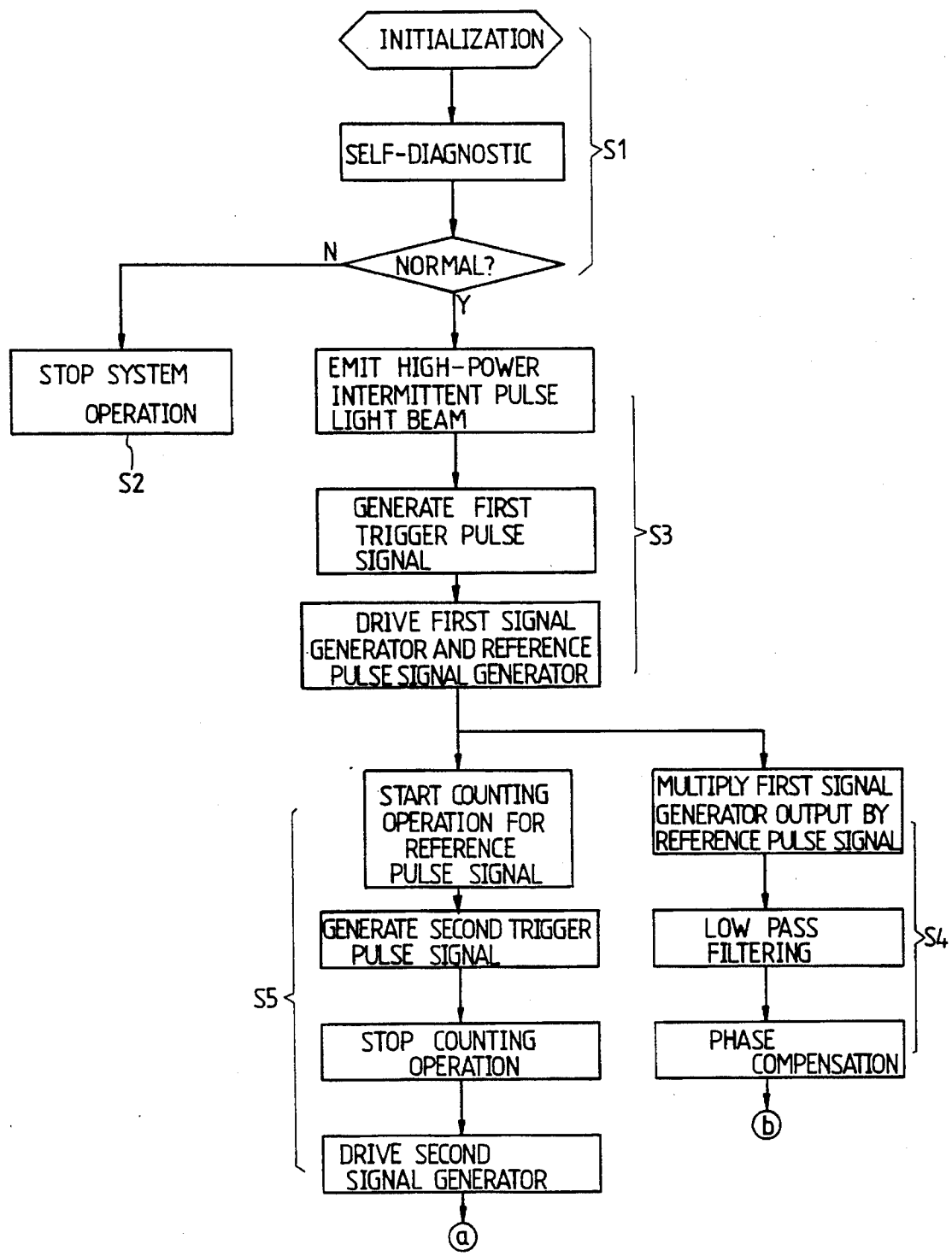

Referring to FIG. 1, there is shown a block diagram of an apparatus for measuring a distance optically using a phase variation in accordance with the present invention. As shown in this drawing, the distance measurement apparatus comprises a light emitting circuit 20 for emitting a high-power intermittent pulse light beam as a distance measuring medium to an object 10, and a light receiving circuit 30 for receiving a light beam reflected from the object 10.

A signal generation/phase difference detection circuit 40 is adapted to generate first and second pseudo intermittent pulse signals in response to a drive signal from the light emitting circuit 20 and an output signal from the light receiving circuit 30, respectively, detect a phase difference between the generated first and second pseudo intermittent pulse signals and measure a phase-delayed time on the basis of the detected phase difference.

A controller 50 is adapted to control the entire operation of a system in response to an output signal from the signal generation/phase difference detection circuit 40.

The light emitting circuit 20 includes a laser diode 21 as a light source for producing the high-power intermittent pulse light beam, a laser diode driving circuit 22 for outputting the drive signal to the laser diode 21 to drive it, and an optical device 23 for focusing the light beam from the laser diode 21 and diffusing the focused light beam at a desired angle to emit it to the object 10.

The light receiving circuit 30 includes an optical device 31 for condensing only a part of the light beam reflected from the object 10, corresponding to the light beam emitted from the light emitting circuit 20, to remove an external light beam therefrom, a photo diode 32 for performing a photoelectric conversion operation for the light beam condensed by the optical device 31 to produce an electrical signal, and an amplification/wave-shaping circuit 33 for converting a current signal from the photo diode 32 into a voltage signal, amplifying the converted voltage signal, wave-shaping the amplified voltage signal and converting the wave-shaped voltage signal into a digital signal.

The signal generation/phase difference detection circuit 40 includes a first signal generator 41A for generating the first pseudo intermittent pulse signal in response to the drive signal from the light emitting circuit 20, a reference pulse signal generator 42 for generating a reference pulse signal in response to the drive signal from the light emitting circuit 20, a second signal generator 41B for generating the second pseudo intermittent pulse signal in response to the output signal from the light receiving circuit 30, a first multiplier 43A for multiplying the first pseudo intermittent pulse signal from the first signal generator 41A by the reference pulse signal from the reference pulse signal generator 42, a second multiplier 43B for multiplying the second pseudo intermittent pulse signal from the second signal generator 41B by the reference pulse signal from the reference pulse signal generator 42, a first low pass filter 44A for passing only a low-frequency component of an output signal from the first multiplier 43A, and a second low pass filter 44B for passing only a low-frequency component of an output signal from the second multiplier 43B.

Also, the signal generation/phase difference detection circuit 40 includes a first phase compensator 45A for compensating for a phase of an output signal from the first low pass filter 44A, a second phase compensator 45B for compensating for a phase of an output signal from the second low pass filter 44B, a phase difference detector 46 for detecting a phase difference between output signals from the first and second phase compensators 45A and 45B, and a phase-delayed time measurement unit 47 for measuring the phase-delayed time according to the phase difference detected by the phase difference detector 46 and a clock CLK.

The operation of the distance measurement apparatus with the above-mentioned construction in accordance with the present invention will hereinafter be described in detail.

In accordance with the preferred embodiment of the present invention, the distance to the object is measured by using two high frequencies with a small difference. Namely, a phase difference resulting from a movement of the light beam is converted into that of a low-frequency component which is the difference between the two high frequencies. A light transit time is measured on the basis of the phase difference of the low frequency component. Then, the distance to the object is measured on the basis of the measured light moving time.

A main feature of the present invention is to measure the phase difference using the intermittent pulse light beam instead of a successive pulse light beam as well-known in the art. In particular, in a long-distance measurement system utilizing the laser, it is preferred that the laser diode 21 which emits the high-power intermittent pulse light beam be used, in view of its safety characteristic. In this connection, the present invention can be applied to even the long-distance measurement system.

In operation, upon receiving a laser diode ON signal LD ON from the controller 50, the laser diode driving circuit 22 outputs the drive signal to the laser diode 21 to drive it. In response to the drive signal from the laser diode driving circuit 22, the laser diode 21 emits the high-power intermittent pulse light beam. At this time, the drive signal from the laser diode driving circuit 22 is also applied as a first trigger pulse signal TRG1 to the first signal generator 41A and the reference pulse signal generator 42. In response to the first trigger pulse signal TRG1 from the laser diode driving circuit 22, the first signal generator 41A generates the first pseudo intermittent pulse signal and the reference pulse signal generator 42 generates the reference pulse signal. The first trigger pulse signal TRG1 from the laser diode driving circuit 22 is also applied to the controller 50, thereby causing the controller 50 to count the reference pulse signal from the reference pulse signal generator 42.

The controller 50 performs the counting operation continuously until it inputs a second trigger pulse signal TRG2.

The first pseudo intermittent pulse signal from the first signal generator 41A is multiplied by the reference pulse signal from the reference pulse signal generator 42 by the first multiplier 43A. Here, it should be noted that a frequency of the output signal from the first signal generator 41A is somewhat lower than that of the output signal from the reference pulse signal generator 42. As a result, the first multiplier 43A provides the output signal in which the high and low frequency components are mixed. Namely, $$Fo = \sin w_0 t$$

$$Fs = \sin w_1 t$$

$$w = 2\pi f$$

where, Fo is the output signal from the reference pulse signal generator 42 and Fs is the output signal from the first signal generator 41A.

Multiplying the above two signals, the result is:

$$F_{M1} = Fo \times Fs = \sin w_0 t \times \sin w_1 t = -\tfrac{1}{2}\{\cos (w_0 t + w_1 t) - \cos (w_0 t - w_1 t)\}$$

where, $F_{M1}$ is the output signal from the first multiplier 43A.

From the above equation, it can be seen that the high and low frequency components are present in the output signal from the first multiplier 43A. The high-frequency component of the output signal from the first multiplier 43A is about twice that of the output signal from the reference pulse signal generator 42 and the low-frequency component thereof is a difference between the frequencies of the output signals from the reference pulse signal generator 42 and the first signal generator 41A.

The first low pass filter 44A passes only the low-frequency component of the output signal from the first multiplier 43A. The signal $F_{M1}$ passed through the first low pass filter 44A can be expressed as follows:

$$F_{M1} = \cos (w_0 t - w_1 t)/2$$

On the other hand, in the light receiving circuit 30, the optical device 31 condenses only the part of the light beam reflected from the object 10, corresponding to the light beam emitted from the light emitting circuit 20. The photo diode 32 converts the light beam condensed by the optical device 31 into the current signal. The amplification/wave-shaping circuit 33 converts the current signal from the photo diode 32 into the voltage signal, amplifies the converted voltage signal, wave-shapes the amplified voltage signal and converts the wave-shaped voltage signal into the digital signal.

The digital signal from the amplification/wave-shaping circuit 33 is applied as the second trigger pulse signal TRG2 to the controller 50, thereby causing the controller 50 to stop the counting operation. The second trigger pulse signal TRG2 from the amplification/wave-shaping circuit 33 is also applied to the second signal generator 41B. In response to the second trigger pulse signal TRG2 from the amplification/wave-shaping circuit 33, the second signal generator 41B generates the second pseudo intermittent pulse signal.

The second pseudo intermittent pulse signal from the second signal generator 41B is multiplied by the reference pulse signal from the reference pulse signal generator 42 by the second multiplier 43B, the output signal of which is then passed through the second low pass filter 44B for removal of the high-frequency component thereof. Namely, the operations of the second multiplier 43B and the second low pass filter 44B are performed in the same manner as those of the first multiplier 43A and the first low pass filter 44A.

At this time, the output signal from the reference pulse signal generator 42 has a phase difference related to a light transit distance. The output signal from the second signal generator 41B and the output signal from the reference pulse signal generator 42 can be expressed as follows:

$Fo'= \sin(w_0 t + \Phi)$ $F_R = \sin w_1 t$ $w = 2\pi f$ where, Fo' is the output signal from the reference pulse signal generator 42 and $F_R$ is the output signal from the second signal generator 41B.

Multiplying the above two signals, the result $$F_{M2} = Fo' \times F_R = \sin(w_0 t + \Phi) \times \sin w_1 t$$
$$= -1/2\{\cos[(w_0 t + \Phi) + w_1 t] - \cos[(w_0 t + \Phi) - w_1 t]\}$$

where, $F_{M2}$ is the output signal from the second multiplier 43B.

From the above equation, it can be seen that the high and low frequency components are present in the output signal from the second multiplier 43B. The high-frequency component of the output signal from the second multiplier 43B is about twice that of the output signal from the reference pulse signal generator 42 and the low-frequency component thereof is a difference between the frequencies of the output signals from the reference pulse signal generator 42 and the second signal generator 41B.

The second low pass filter 44B passes only the low frequency component of the output signal from the second multiplier 43B. The signal $F_{M2}$ passed through the second low pass filter 44B can be expressed as follows:

$F_{M2} = \frac{1}{2}\cos\{(w_0 t + \Phi) - w_1 t\}$

The phase difference detector 46 detects a phase difference between the two low-frequency signals $F_{M1}$ and $F_{M2}$ with difference phases and the phase-delayed time measurement unit 47 reads the time of the detected phase difference from the phase difference detector 46 using the clock CLK, which corresponds to a desired resolution. The controller 50 calculates the light transit time on the basis of the number of the reference pulses counted for the interval between the first and second trigger pulse signals TRG1 and TRG2, and the detected phase difference time. Namely, light transit time = (CNT1 × one reference pulse generation period) + (CNT2 × one CLK period)

where CNT1 is the number of references pulses counted between the first and second trigger pulse signals TRG1 and TRG2; and where CNT2 is the detected phase difference time.

Then, the distance to the object can be obtained on the basis of the light transit time and a light velocity. Namely, distance to object=(light transit time×light velocity)/2

FIGS. 2A and 2B are flowcharts illustrating a method of measuring the distance optically using the phase variation in accordance with the present invention. At the step S1, the system is initialized and a self-diagnostic operation is performed to check whether the system is normal. If it is checked at the step S1 that the system is not normal, the operation of the system is stopped at the step S2. If it is checked at the step S1 that the system is normal, the high-power intermittent pulse light beam is emitted and the first trigger pulse signal TRG1 is generated to drive the first signal generator 41A and the reference pulse signal generator 42, at the step S3. At the step S4, the output signal from the first signal generator 41A is multiplied by the reference pulse signal from the reference pulse signal generator 42, the multiplied signal is passed through the first low pass filter 44A and the resultant signal is phase-compensated.

At the step S5, the reference pulse signal counting operation is started and performed until the second trigger pulse signal TRG2 is generated. At that time that the second trigger pulse signal TRG2 is generated, the reference pulse signal counting operation is stopped and the second signal generator 41B is driven. At the step S6, the output signal from the second signal generator 41B is multiplied by the reference pulse signal from the reference pulse signal generator 42, the multiplied signal is passed through the second low pass filter 44B and the resultant signal is phase-compensated. Then, at the step S7, the phase difference between the two phase-compensated signals is detected, the light transit time is calculated on the basis of the measured phase difference and the distance to the object is calculated on the basis of the calculated light transit time.

As apparent from the above description, according to the present invention, the distance measurement is performed by detecting the phase difference between the pseudo pulses at the points of time of emitting and receiving the pulse light beam. Therefore, the distance to the object can be measured with no contact using the light beam in the long-distance measurement system employing the pulse laser diode. This has the effect of increasing the accuracy of the system. Also, the present invention is applicable to various distance measurements including a distance measurement of a car collision prevention system.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for measuring a distance optically using a phase variation, comprising:

light emitting means for emitting a high-power intermittent pulse light beam as a distance measuring medium to an object;

light receiving means for receiving a light beam reflected from the object;

signal generation and phase difference detection means for generating first and second pseudo intermittent pulse signals in response to a drive signal from said light emitting means and an output signal from said light receiving means, respectively, detecting a phase difference between the generated first and second pseudo intermittent pulse signals and measuring a phase-delayed time on the basis of the detected phase difference; and control means for controlling the entire operation of a system in response to an output signal from said signal generation/phase difference detection means.

2. An apparatus for measuring a distance optically using a phase variation, as set forth in claim 1, wherein said signal generation and phase difference detection means includes:

a first signal generator for generating the first pseudo intermittent pulse signal in response to the drive signal from said light emitting means;

a reference pulse signal generator for generating a reference pulse signal in response to the drive signal from said light emitting means;

a second signal generator for generating the second pseudo intermittent pulse signal in response to the output signal from said light receiving means;

a first multiplier for multiplying the first pseudo intermittent pulse signal from said first signal generator by the reference pulse signal from said reference pulse signal generator;

a second multiplier for multiplying the second pseudo intermittent pulse signal from said second signal generator by the reference pulse signal from said reference pulse signal generator;

a first low pass filter for passing only a low frequency component of an output signal from said first multiplier;

a second low pass filter for passing only a low frequency component of an output signal from said second multiplier;

a first phase compensator for compensating for a phase of an output signal from said first low pass filter;

a second phase compensator for compensating for a phase of an output signal from said second low pass filter;

a phase difference detector for detecting a phase difference between output signals from said first and second phase compensators; and a phase-delayed time measurement unit for measuring the phase-delayed time according to the phase difference detected by said phase difference detector and a clock.

3. A method of measuring a distance optically using a phase variation, comprising the steps of:

(a) initializing a system and performing a self-diagnostic operation to check whether the system is normal;

(b) stopping an operation of the system if it is checked at said step (a) that the system is not normal;

(c) emitting a high-power intermittent pulse light beam if it is checked at said step (a) that the system is normal and generating a first trigger pulse signal to generate a first pseudo intermittent pulse signal and a reference pulse signal;

(d) multiplying said first pseudo intermittent pulse signal by said reference pulse signal, low pass filtering the multiplied signal and compensating for a phase of the low pass filtered signal;

(e) performing a counting operation for said reference pulse signal until a second trigger pulse signal is generated, stopping said reference pulse signal counting operation if said second trigger pulse signal is generated and generating a second pseudo intermittent pulse signal;

(f) multiplying said second pseudo intermittent pulse signal by said reference pulse signal, low pass filtering the multiplied signal and compensating for a phase of the low pass filtered signal; and (g) detecting a phase difference between said two phase-compensated signals, calculating a light transit time on the basis of the detected phase difference and calculating a distance to an object on the basis of the calculated light transit time.

* * * * *